E. RIMAILHO.
RESILIENT TIRE.
APPLICATION FILED MAY 15, 1909.

1,039,805.

Patented Oct. 1, 1912.
4 SHEETS—SHEET 1.

Witnesses:

Inventor:
Emile Rimailho
by his Attorney

E. RIMAILHO.
RESILIENT TIRE.
APPLICATION FILED MAY 15, 1909.
1,039,805.
Patented Oct. 1, 1912.
4 SHEETS—SHEET 2.
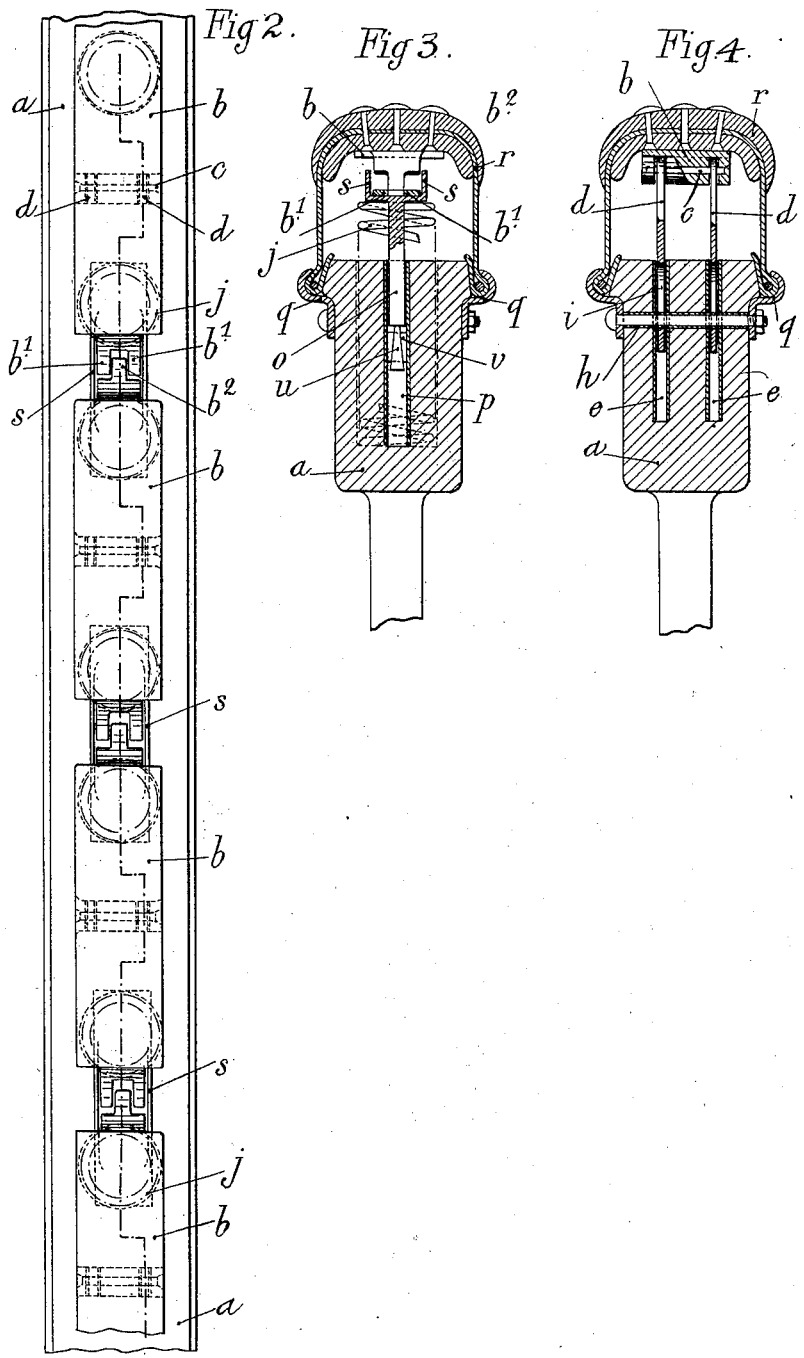

E. RIMAILHO.
RESILIENT TIRE.
APPLICATION FILED MAY 15, 1909.

1,039,805.

Patented Oct. 1, 1912.
4 SHEETS—SHEET 3.

Witnesses:—
Inventor:—
Emile Rimailho
by his Attorney

E. RIMAILHO.
RESILIENT TIRE.
APPLICATION FILED MAY 15, 1909.
1,039,805.
Patented Oct. 1, 1912.
4 SHEETS—SHEET 4.
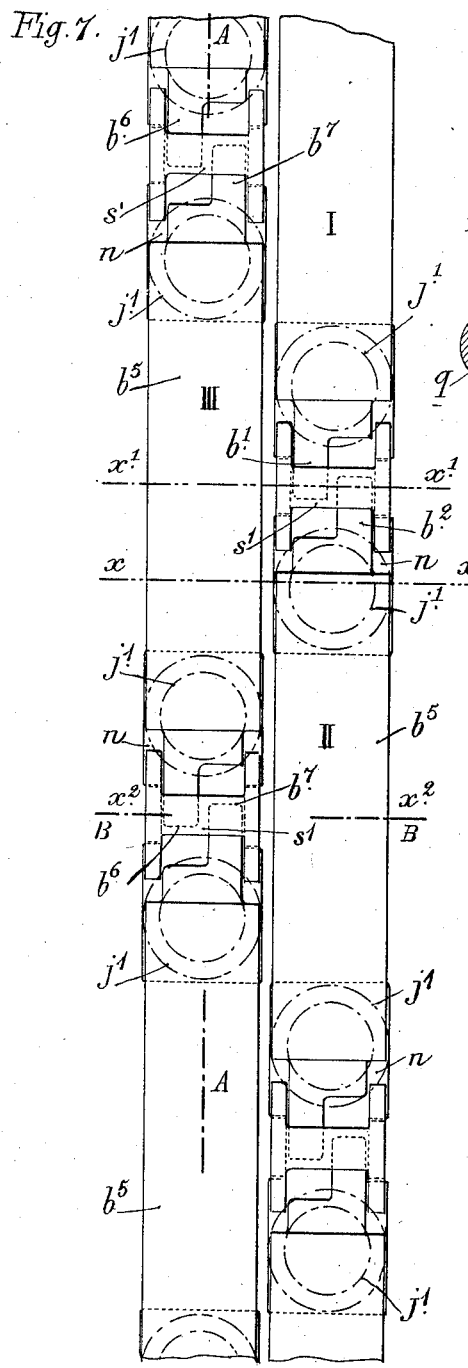
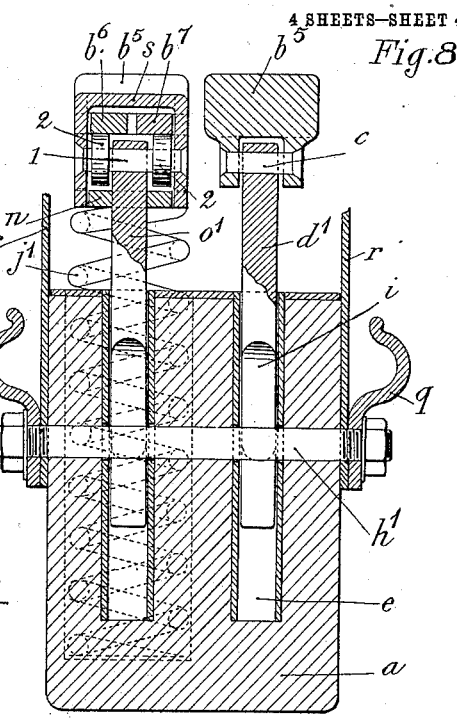
Witnesses:—
Inventor:—
Emile Rimailho
by his Attorney

UNITED STATES PATENT OFFICE.

EMILE RIMAILHO, OF NEUILLY-SUR-SEINE, FRANCE.

RESILIENT TIRE.

1,039,805.     Specification of Letters Patent.     Patented Oct. 1, 1912.

Application filed May 15, 1909. Serial No. 496,288.

*To all whom it may concern:*

Be it known that I, EMILE RIMAILHO, a citizen of the French Republic, residing at 61 Avenue de Neuilly, Neuilly-sur-Seine, Seine, France, have invented new and useful Improvements in Resilient Tires, of which the following is a specification.

My invention relates to an improved form of resilient tire, wherein the tread is composed of a plurality of independent sections or plates, each thereof being pivotally carried by a support capable of reciprocating radially in the wheel on which the tire is formed.

The principal object of my invention is to provide a tire of this character which shall embody all the advantages known to inhere in the usual pneumatic tires, such as resilience, smooth running and the like, and will be free from the disadvantageous feature of pneumatic tires, such as their susceptibility to puncture and their tendency to explode or burst.

The invention may be embodied in numerous forms and in the accompanying drawing several modifications of the inventive idea are illustratively exemplified.

Figures 1, 5:
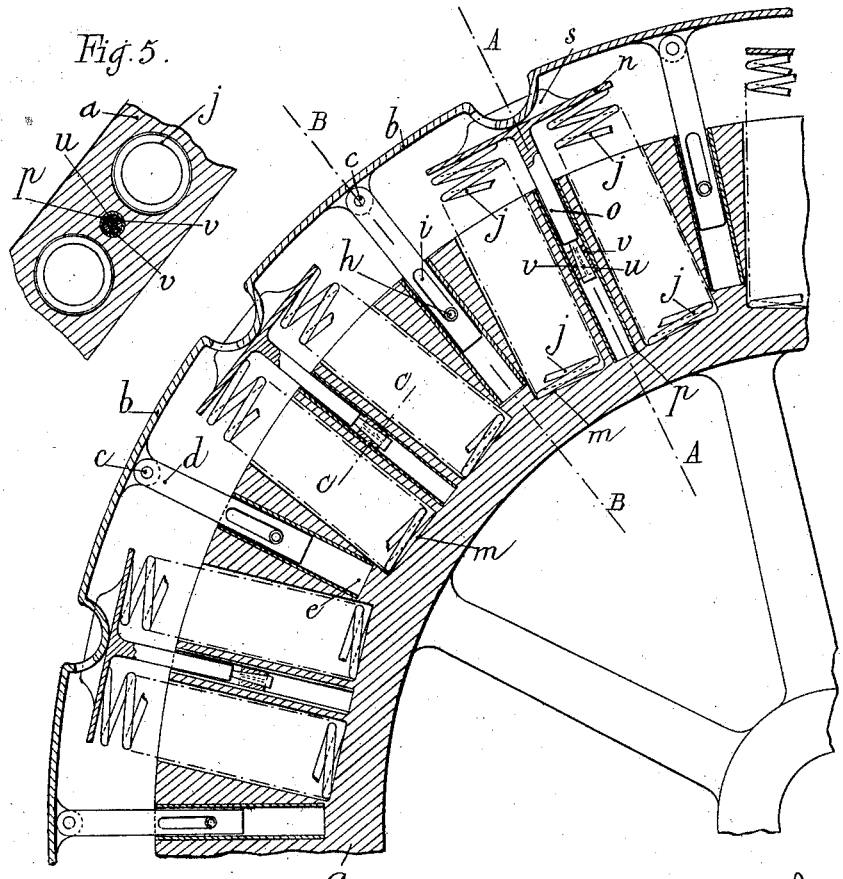
Figure 6:
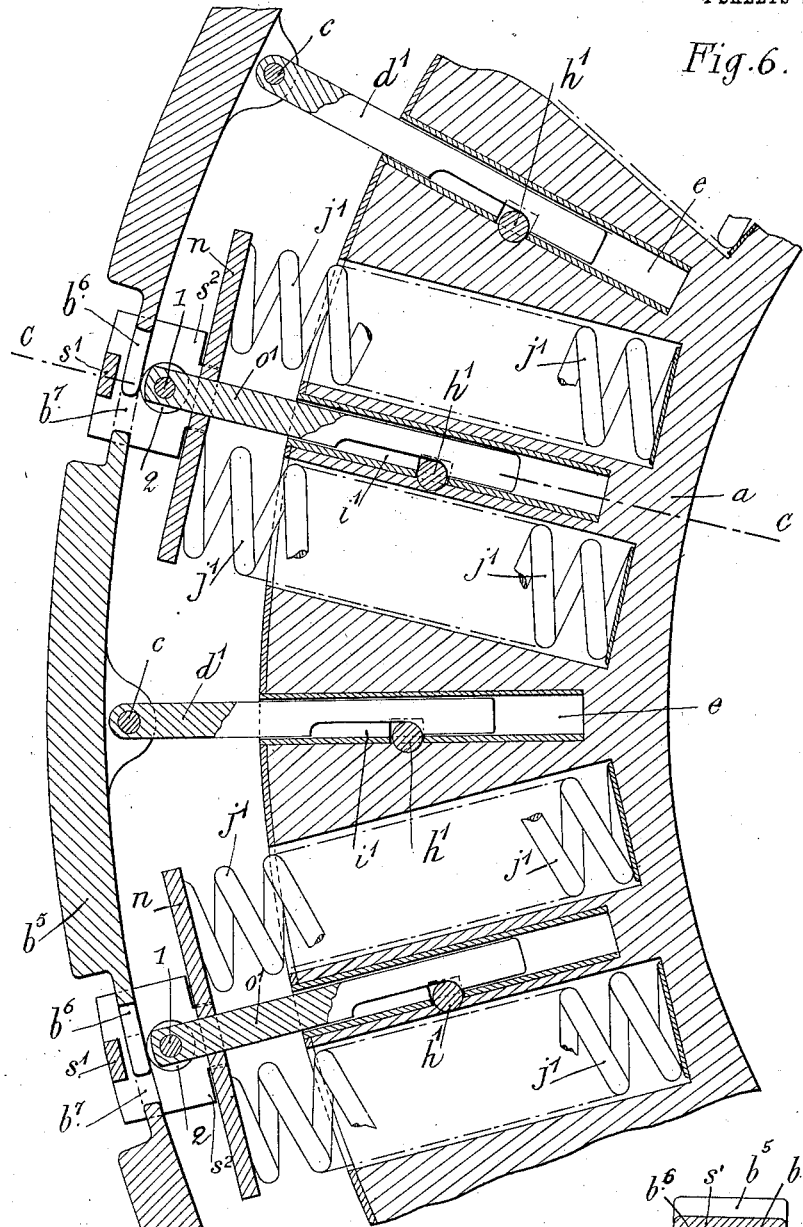
Figure 9:
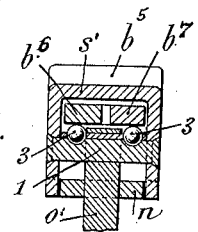

In the drawings wherein the tire cover or casing has been omitted from the figures in longitudinal section, Figure 1 is a partial longitudinal section of the device embodying my invention; Fig. 2 is a plan view thereof; Fig. 3 is a cross section of the same on the line A—A of Fig. 1 a tire casing being shown in position on the wheel. Fig. 4 is a cross section of the same on the line B—B of Fig. 1, a tire casing being shown in position on the wheel; Fig. 5 is a cross section of the same on the line C—C of Fig. 1; Fig. 6 is a partial longitudinal section of a modified form of the improved tire on the line A—A of Fig. 7; Fig. 7 is a partial plan of the same. Fig. 8 is a cross section on the line B—B of Fig. 7 and on the line C—C of Fig. 6. Fig. 9 is a cross section of a modification of the construction shown in Figs. 6 to 8.

Referring to the drawing, $a$ represents the felly of a wheel, the tire of which is formed of a series of adjacent plates $b$, each thereof being pivoted at $c$ to one end of a support $d$ which may slide or reciprocate radially of the wheel by any suitable arrangement, as by being placed in a recess $e$ formed therein. The plates $b$ may be of any suitable size or number, and it will be understood that the number of such plates employed determines the number of supports $d$. The outward movement of the supports $d$ is preferably limited, and while a variety of means may be employed to accomplish this purpose, I prefer to provide in each recess $e$ a cross pin or bar $h$ preferably of tubular form, which projects through a slot $i$ in the support $d$ and prevents the support from moving outwardly too great a distance. As shown in Figs. 1 and 4 I may provide for each plate $b$ two supports $d$ each of which moves in a separate recess $e$.

To absorb the shocks imparted to the wheel during travel and to give it the desired resiliency, I provide suitable resilient elements such as coiled springs $j$ having one of their ends resting in the bottom of recesses $m$ formed in the wheel felly, and their other ends extending into proximity to the ends of adjacent plates $b$. When pressure is exerted upon the tread these springs are compressed and after removal of pressure the springs unflex and return the plates to normal position.

From Figs. 1 to 5 of the drawing it will be noted that the coiled springs are preferably in pairs and are arranged at the ends of each pair of plates, these ends having a peculiar formation and bearing upon a plate arranged over the upper ends of the springs. Each spring $j$ of a pair extends into a recess $m$ of the felly, and between the recesses $m$ a recess $p$ is provided in which slides a stem $o$ the upper part of which is formed as a cap $n$ resting upon the tops of the springs $j$. The cap $n$ is provided with lateral lugs $s$, between which the downwardly curved dove-tailed ends $b'$ $b'$ and $b^2$ of the plates $b$ rest upon the caps $n$ (Fig. 2).

One of the features of my invention contemplates the provision of means for impeding or braking the too sudden recoil of the springs $j$ when pressure is removed from the plates $b$, and this result may be accomplished, by various means, the preferred means being illustrated in Fig. 1 of the drawing and as there shown such means comprise the formation of a truncated conical tail piece $u$ on the end of each stem $o$, this tail piece being adapted to coöperate with annular segments $v$ having a cylindrical outer surface and a truncated conical inner surface. In their movement toward the hub the stems $o$ are not impeded, but in their outward return movement the segments $v$ are moved with the tail pieces $u$ thus producing increased friction which retards the return movement of the stems.

In the modified form of invention illustrated in Figs. 6 to 8, I have shown a tire composed of two parallel series of plates $b^5$. The invention as thus constructed includes the plates $b^5$, the adjacent ends $b^6$ and $b^7$ of which rest upon bearings 2 carried by short shafts or studs 1 which pass through the upper parts of the stems $o'$. In this form of the invention the side lugs $s^2$ are connected by transverse bars $s'$ thus forming stirrup like members in which the ends $b^6$ $b^7$ bear. The plates $b^5$ are pivoted at $c$ to one end of a support $d'$ capable of reciprocating radially in a recess $e$ in the wheel, said support having a slot $i'$ through which a preferably tubular cross pin $h'$ projects.

Figs. 6, 7, and 8 show a construction in which the two bands are so arranged that the pivot $c$ of one plate of one of the bands is situated opposite the bearing line of the ends $b^6$ $b^7$ of two consecutive plates of the other band. In other words the resilient elements of one of the bands are arranged in staggered relation to those of the other band. This arrangement is advantageous by reason of the fact that the entire tire possesses at all points of the wheel practically the same radial deformability. Whatever the line $x-x$ (Fig. 7) may be along which the tire comes in contact with the road surface, the compression will always be distributed over three resilient elements. If contact is assumed to take place along the line $x'-x'$ the resilient element $j'-j'$ of the right hand band will be deformed directly, as the ends of those plates $b^5$, (marked I and II) can follow the movement owing to the pivotal connection $c$ of the said plates. At the same time the plate $b^5$ (which is marked III) of the left hand band whose pivot $c$ is nearer to the axis of the wheel, will transmit the stress through its ends $b^6$ and $b^7$ respectively to two consecutive resilient elements of the band of which it forms a part.

If contact takes place along the line $x^2-x^2$ the resilient element opposite the plate II will be stressed directly, while the stress is transmitted by the plate II of the right hand band to the two consecutive resilient elements at each end of said plate II.

If contact takes place along the line $x-x$ the plate III that is directly stressed will be inclined at the same time as the pivot of the latter plate moves nearer to the axis of the wheel in a radial direction. The ends $b^6$ and $b^7$ of this plate transmit the stress to the two resilient elements at each end of the plate III in a proportion that varies according to the distance between the line $x-x$ and the said ends, whereas the resilient element opposite the band III is stressed directly owing to the pivot $c$ of the rigid plate II.

In Fig. 9, $b^5$ is the tread plate; $b^6$ and $b^7$ the ends thereof; $s'$ the transverse bars connecting the side lugs; $o'$ the reciprocable stem or support engaged by the shaft or stud 1; $n$ the plate against which the resilient elements abut and 3 are ball bearings interposed between the upper face of the shaft 1 and the lower faces of the ends $b^6$ and $b^7$.

As shown in certain of the figures, I may, if desired, provide removable side plates $q$ that hold a protecting cover $r$ which extends over the plates $b$ and $b^5$.

Having thus described my invention what I claim as new and desire to secure by Letters Patent is:—

1. In a resilient tire, the combination of the wheel felly having therein a plurality of relatively narrow radial recesses and a wider recess at each side of the narrower recesses, a stem reciprocable in each of said narrower recesses, a plate carried at one end of each of said stems, a spring in each of said wider recesses, each of said springs having one end thereof abutting against said plate and the opposite end resting in the bottom of the recess, tread-section supports reciprocable radially in the felly, and a tread section pivotally supported at approximately its central part at one end of each support, the ends of each two adjacent tread sections resting on one of said plates, and said tread sections being capable of free movement about their points of pivotal support.

2. In a resilient tire, the combination of the wheel felly having therein a plurality of relatively narrow radial recesses and a wider recess at each side of the narrower recesses, a stem reciprocable in each of said narrower recesses, a plate carried at one end of each of said stems, a spring in each of said wider recesses, each of said springs having one end thereof abutting against said plate and the opposite end resting in the bottom of the recess, tread section supports reciprocable radially in the felly, means passing through said supports for limiting the extent of movement thereof in either direction, and a tread section pivoted at approximately its central part to one end of each support, the ends of each two adjacent tread sections resting on one of said plates.

3. In a resilient tire, the combination with a tread consisting of a series of independent successive plates, of supports reciprocable radially in recesses in the wheel and having the plates pivoted thereto, resilient means arranged in proximity to adjacent end of said plates and adapted to act against said plates, a cross bar in each of said recesses projecting through slots in said supports, stems arranged in recesses between adjacent resilient means, a plate carried by each stem in operative positional relation to said resilient means, a tail piece formed on each stem, and segments engaging said tail pieces to brake the recoil movement of said resilient means.

4. In a resilient tire, the combination of the wheel felly having therein a plurality of relatively narrow radial recesses and a wider recess at each side of the narrower recesses, a stem reciprocable in each of said narrower recesses, a tail piece attached to one end of said stem, an annular segment in each of said narrower recesses in coöperative relation with said tail piece, a plate at the end of each stem opposite that to which the tail piece is attached, a spring in each of the wider recesses, said springs having one end thereof bearing against said plates, tread section supports reciprocable radially in said felly, a tubular cross bar passing through each of said supports and adapted to limit the extent of movement of the latter in either direction, and a tread section pivoted at approximately its central part to one end of each support, the ends of each two adjacent tread sections resting on one of said plates.

In testimony whereof I have signed my name to this specification in the presence of two subscribing witnesses.

EMILE RIMAILHO.

Witnesses:
 Louis Faubriet,
 H. C. Coxe.

---

Copies of this patent may be obtained for five cents each, by addressing the "Commissioner of Patents, Washington, D. C."